(12) United States Patent
Nakashima et al.

(10) Patent No.: US 10,777,918 B2
(45) Date of Patent: Sep. 15, 2020

(54) TERMINAL BLOCK AND METHOD FOR MANUFACTURING SAME

(71) Applicants: AUTONETWORKS TECHNOLOGIES, LTD., Yokkaichi-shi, Mie (JP); SUMITOMO WIRING SYSTEMS, LIMITED, Yokkaichi-shi, Mie (JP); SUMITOMO ELECTRIC INDUSTRIES, LTD., Osaka-shi, Osaka (JP)

(72) Inventors: Kazuo Nakashima, Yokkaichi (JP); Katsufumi Matsui, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/074,721

(22) PCT Filed: Feb. 9, 2017

(86) PCT No.: PCT/JP2017/004813
§ 371 (c)(1),
(2) Date: Aug. 1, 2018

(87) PCT Pub. No.: WO2017/141822
PCT Pub. Date: Aug. 24, 2017

(65) Prior Publication Data
US 2019/0044257 A1    Feb. 7, 2019

(30) Foreign Application Priority Data

Feb. 18, 2016    (JP) .................... 2016-029016

(51) Int. Cl.
*H01R 13/52*    (2006.01)
*H01R 9/24*    (2006.01)
(Continued)

(52) U.S. Cl.
CPC ............ *H01R 9/24* (2013.01); *H01R 9/223* (2013.01); *H01R 13/521* (2013.01);
(Continued)

(58) Field of Classification Search
CPC ..................... H01R 13/521; H01R 13/5216
See application file for complete search history.

(56) References Cited

U.S. PATENT DOCUMENTS 3,522,575 A * 8/1970 Johnson .................. H01J 5/32
439/281
8,011,976 B2 * 9/2011 Ooki ..................... H01R 13/50
439/736
(Continued)

FOREIGN PATENT DOCUMENTS

JP    2012-003842 A    1/2012
JP    2013-045510 A    3/2013
(Continued)

OTHER PUBLICATIONS

May 9, 2017 International Search Report issued in International Patent Application No. PCT/JP2017/004813.

*Primary Examiner* — Tho D Ta
(74) *Attorney, Agent, or Firm* — Oliff PLC

(57) ABSTRACT

A terminal block that includes a housing having a resin part; a bus bar integrally including an embedded part embedded in the resin part and a connecting part projecting outward from the resin part; and a seal sealing a gap existing between the embedded part and the resin part, wherein the seal is formed by an adhesive sheet.

4 Claims, 3 Drawing Sheets

(51) Int. Cl.
- *H01R 43/00* (2006.01)
- *H01R 9/22* (2006.01)
- *H01R 43/18* (2006.01)
- *B60R 16/02* (2006.01)

(52) U.S. Cl.
CPC ....... *H01R 13/5216* (2013.01); *H01R 43/005* (2013.01); *H01R 43/18* (2013.01); *B60R 16/0207* (2013.01)

(56) References Cited

U.S. PATENT DOCUMENTS

| | | | | |
|---|---|---|---|---|
| 9,490,565 | B2* | 11/2016 | Beck | H01R 13/41 |
| 2008/0261039 | A1* | 10/2008 | Tanaka | H01L 21/67132 |
| | | | | 428/352 |
| 2016/0134049 | A1 | 5/2016 | Kataoka et al. | |

FOREIGN PATENT DOCUMENTS

| | | | |
|---|---|---|---|
| JP | 2014-107212 A | | 6/2014 |
| JP | 201511949 A | * | 1/2015 |
| JP | 2015-138679 A | | 7/2015 |
| JP | 2015-138680 A | | 7/2015 |
| JP | 2015122161 A | * | 7/2015 |

* cited by examiner

TERMINAL BLOCK AND METHOD FOR MANUFACTURING SAME

This application is the U.S. National Phase of PCT/JP2017/004813 filed Feb. 9, 2017, which claims priority from JP 2016-029016 filed Feb. 18, 2016, the disclosure of which is incorporated herein by reference.

BACKGROUND

The present disclosure relates to a terminal block and a method for manufacturing the same.

Heretofore, terminal blocks to which an automotive wire harness or the like is connected are known. A terminal block, generally, has metal bus bars and a housing having a resin part, with the bus bars being fixed to the resin part through insert molding.

The resin part normally does not readily adhere to the metal bus bars, and also tends to vary in size due to mold shrinkage and the like. Thus, a gap is inevitably formed between the resin part and the bus bars. Therefore, a sealing part is provided in the gap portion so as to prevent the intrusion of liquids such as oil. An adhesive coating material obtained by diluting an adhesive with an organic solvent is generally used for this sealing part, as described in JP 2013-45510A and the like.

SUMMARY

However, with a terminal block having a sealing part formed from an adhesive coating material, a process of drying the organic solvent will be required prior to insert molding, after application of the adhesive coating material. Thus, the above terminal block requires that drying time be secured, and takes time to manufacture. Also, manufacturing management, such as needing to use a sealed syringe so that the organic solvent does not volatilize, since the viscosity of the adhesive coating material must be kept constant, from the viewpoint of applying the adhesive coating material evenly, is difficult at the time of manufacture with the above terminal block. Also, obtaining a sealing part of uniform width and thickness is difficult using an adhesive coating material.

An exemplary aspect of the present disclosure provides a terminal block with respect to which a sealing part is readily formed to be uniform in width and thickness, manufacturing time can be shortened and manufacturing management is facilitated, and a method for manufacturing the terminal block.

One aspect of the present disclosure is directed to a terminal block that has a housing having a resin part, a bus bar integrally including an embedded part embedded in the resin part and a connecting part projecting outward from the resin part, and a seal sealing a gap existing between the embedded part and the resin part, the seal being formed by an adhesive sheet.

Another aspect of the present disclosure is directed to a method for manufacturing a terminal block that has a housing having a resin part, a bus bar integrally including an embedded part embedded in the resin part and a connecting part projecting outward from the resin part, and a seal sealing a gap existing between the embedded part and the resin part, the method including attaching an adhesive sheet to a place on the bus bar where the seal is to be formed, and integrating the bus bar to which the adhesive sheet is attached with the resin part through insert molding, and forming the seal that is formed by the adhesive sheet.

In the above terminal block, the seal is formed by an adhesive sheet. Thus, at the time of manufacturing the terminal block, the seal can be formed by attaching the adhesive sheet to a place on the bus bar where the seal is to be formed, and integrating the bus bar to which the adhesive sheet is attached with the resin part through insert molding. The adhesive sheet that is used for the seal is readily formed to be uniform in width and thickness, compared with an adhesive coating material. Thus, with the above terminal block, the seal is readily formed to be uniform in width and thickness. Also, at the time of manufacturing the terminal block, drying time is unnecessary, unlike an adhesive coating material, and viscosity adjustment is also unnecessary. Accordingly, with the above terminal block, manufacturing time can be shortened and manufacturing management is facilitated.

A method for manufacturing the terminal block has the above steps. Thus, the terminal block with respect to which a seal is readily formed to be uniform in width and thickness, manufacturing time can be shortened and manufacturing management is facilitated can be manufactured.

DETAILED DESCRIPTION OF EMBODIMENTS

Figure 1:
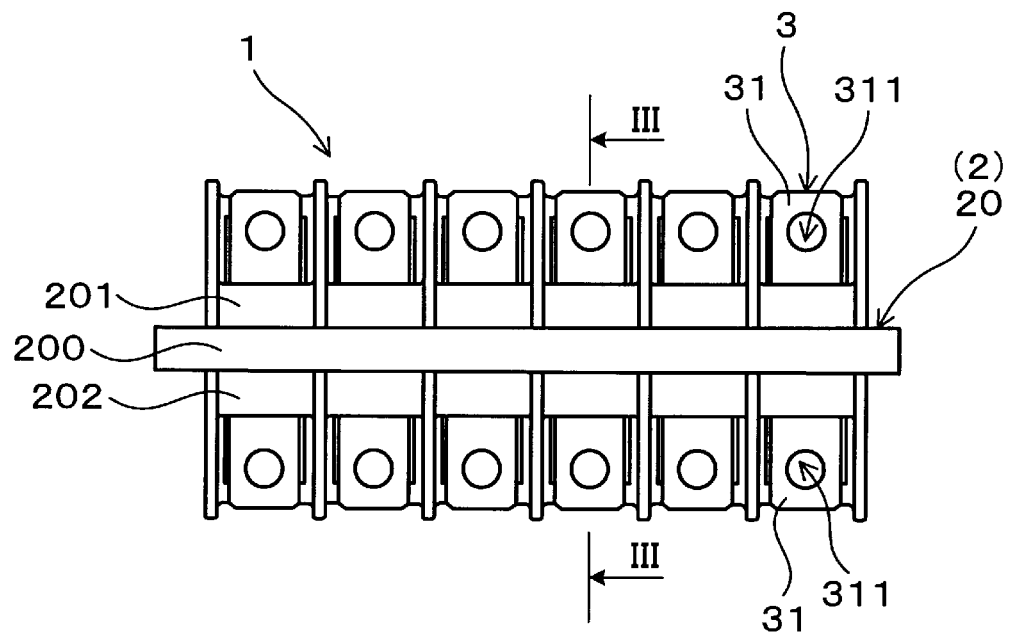
FIG. 1 is a front view of a terminal block in Working Example 1.

The above terminal block will be described.

In the above terminal block, the sealing part (i.e., seal) is formed by an adhesive sheet. The adhesive sheet is a sheet-like (also includes film-like) adhesive. The adhesive sheet can include a thermosetting resin as an adhesive component. In this case, the heat resistance of the sealing part can be improved, compared with the case where a thermoplastic resin is included as an adhesive component. Thus, in this case, a terminal block can be obtained with respect to which the sealing part does not readily leak out externally from the gap between the embedded part and the resin part, even when exposed under a high temperature environment, and sealing performance is readily maintained over a long period of time.

Specifically, resins such as an epoxy resin and an acrylic resin, for example, can be illustrated as the thermosetting resin. In particular, in the case where the thermosetting resin is an epoxy resin, qualities such as heat resistance and oil resistance of the sealing part, workability at the time of attaching the adhesive sheet and adhesiveness to the bus bar are excellent.

The adhesive sheet can also include a thermoplastic resin as an adhesive component. In this case, the adhesive sheet can be adjusted to partially melt due to the heat produced at the time of insert molding, and thus a terminal block can be obtained with respect to which the gap between the embedded part and the resin part is sealed comparatively easily.

Specifically, resins such as a polyamide resin (nylon resin), a polyester resin, a urethane resin and an olefin resin, for example, can be illustrated as the thermoplastic resin.

Note that, other than the adhesive component, the adhesive sheet may include one or multiple additives such as a filler, a pigment and an antioxidant.

In the above terminal block, the sealing part may be arranged in any position in the gap between the embedded part of the bus bar and the resin part of the housing, as long as the gap can be made liquid-tight through insert molding. The sealing part may, for example, be arranged in a portion of the gap or may be arranged in the entire gap. Also, the sealing part may be formed by one adhesive sheet or may be formed by a plurality of adhesive sheets.

Specifically, the sealing part can be formed by, for example, an adhesive sheet wrapped around the outer periphery of the bus bar, in a portion of the embedded part of the bus bar. In this case, a terminal block can be obtained with respect to which the sealing part does not readily leak out externally from the gap between the embedded part and the resin part, even in the case where the flowability of the sealing part increases due to the terminal block being exposed under a high temperature environment, and sealing performance is readily maintained over a long period of time. Also, because the sealing part can be formed from one adhesive sheet, a terminal block having a sealing part that has excellent workability at the time of manufacture and uniform width and thickness can be obtained.

In the above case, the adhesive sheet wrapped around the outer periphery of the bus bar can include a state where, for example, one end face of the adhesive sheet is butted against the other end face. In this case, a step caused by the adhesive sheet tends not to be formed. Thus, a terminal block with respect to which sealability is readily secured can be obtained. Note that the join where one end face of the adhesive sheet butts against the other end face can be formed to have a shape such as a linear shape, a zigzag shape or a combination thereof. Also, the join may disappear due to the heat produced at the time of insert molding.

Also, the adhesive sheet wrapped around the outer periphery of the bus bar can include a state where, for example, one end edge of the adhesive sheet is overlapped by the other end edge. In this case, the join resulting from one end face of the adhesive sheet being butted against the other end face can be eliminated. Thus, in this case, one end face of the adhesive sheet need not be butted against the other end face with high accuracy, at the time of manufacture. Thus, this configuration is advantageous in facilitating manufacturing management of the terminal block.

The width of the sealing part can be preferably set within a range from 1.0 to 10.0 mm, more preferably from 1.5 to 7.5 mm, and still more preferably from 2.5 to 5.0 mm, from the viewpoint of factors such as securing sealability and restrictions on the size of the terminal block.

The thickness of the sealing part can be preferably set within a range from 10 to 500 μm, more preferably from 30 to 400 μm, and still more preferably from 40 to 350 μm, from the viewpoint of factors such as securing sealability and suppressing the flowability of the adhesive sheet due to resin pressure at the time of forming the housing through insert molding. Note that the thickness of the sealing part is an average value of the values of thicknesses that are respectively measured, in the width direction of the bus bar, in the middle and at both ends of the adhesive sheet that is attached to a surface of the bus bar that is perpendicular to the thickness direction.

The above terminal block can be suitably used in order to connect an automotive wire harness, for example. In this case, the terminal block can, more specifically, be suitably used in connecting a high-voltage wire harness in an electric vehicle, a hybrid vehicle, a fuel-cell vehicle, or the like, for example.

A method for manufacturing the terminal block will be described.

In the method for manufacturing the terminal block, an adhesive sheet is attached to a place on the bus bar where the sealing part is to be formed. The place where the sealing part is to be formed is, specifically, within the range of the embedded part of the bus bar.

The adhesive sheet can, specifically, be attached so as to wrap around the outer periphery of the bus bar, in a portion of the embedded part of the bus bar, for example. In this case, a terminal block can be manufactured with respect to which the sealing part does not readily leak out externally from the gap between the embedded part and the resin part, even when the flowability of the sealing part increases due to the terminal block being exposed under a high temperature environment, and sealing performance is readily maintained over a long period of time. Also, because the sealing part can be formed by wrapping one adhesive sheet, a terminal block having a sealing part that has excellent workability at the time of manufacture and uniform width and thickness can be manufactured.

In the method for manufacturing the terminal block, the adhesive sheet can be partially hardened with heat at the time of attaching the adhesive sheet, in the case where the adhesive sheet includes a thermosetting resin. In this case, the adhesive sheet is reliably fixed to the bus bar prior to insert molding, and thus there is an advantage in that the subsequent insert molding is facilitated. Note that, in the case where the adhesive sheet that is used has tackiness, the adhesive sheet can also be attached to the bus bar, utilizing that tackiness.

In the method for manufacturing the terminal block, the bus bar to which the adhesive sheet is attached is integrated with the resin part through insert molding, and a sealing part that is formed by the adhesive sheet is formed. In the case where the adhesive sheet includes a thermosetting resin, for example, the adhesive sheet is hardened by the heat produced at the time of insert molding, and forms the sealing part. Also, in the case where the adhesive sheet includes a thermoplastic resin, for example, the adhesive sheet solidifies after melting due to the heat produced at the time of insert molding, and forms the sealing part.

Note that the abovementioned configurations may be suitably combined if necessary in order to obtain the abovementioned actions and effects and the like.

WORKING EXAMPLES

Hereinafter, a terminal block and a manufacturing method therefor in working examples will be described using the drawings.

Working Example 1

Figure 2:
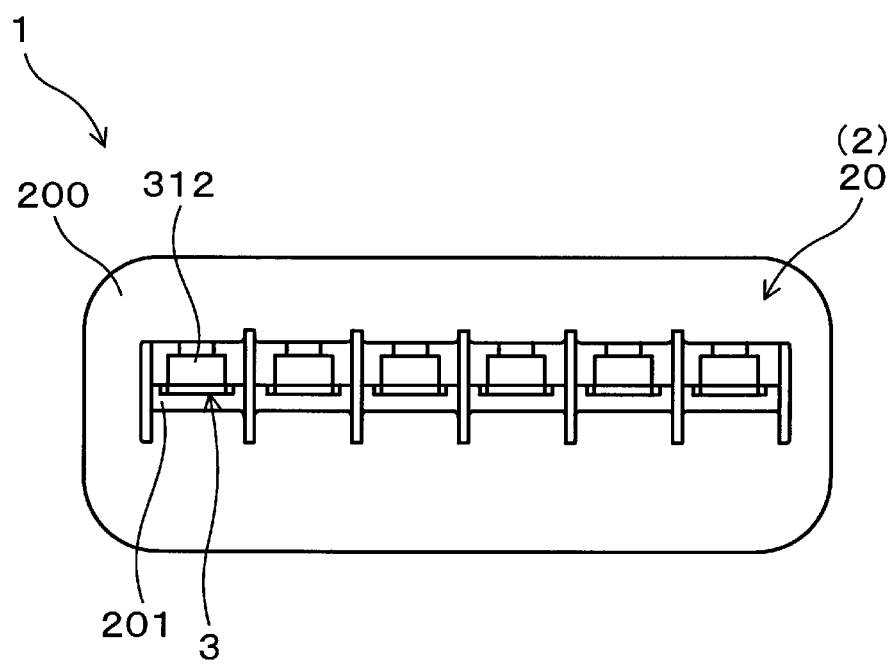
FIG. 2 is a plan view of the terminal block in Working Example 1.
Figure 3:
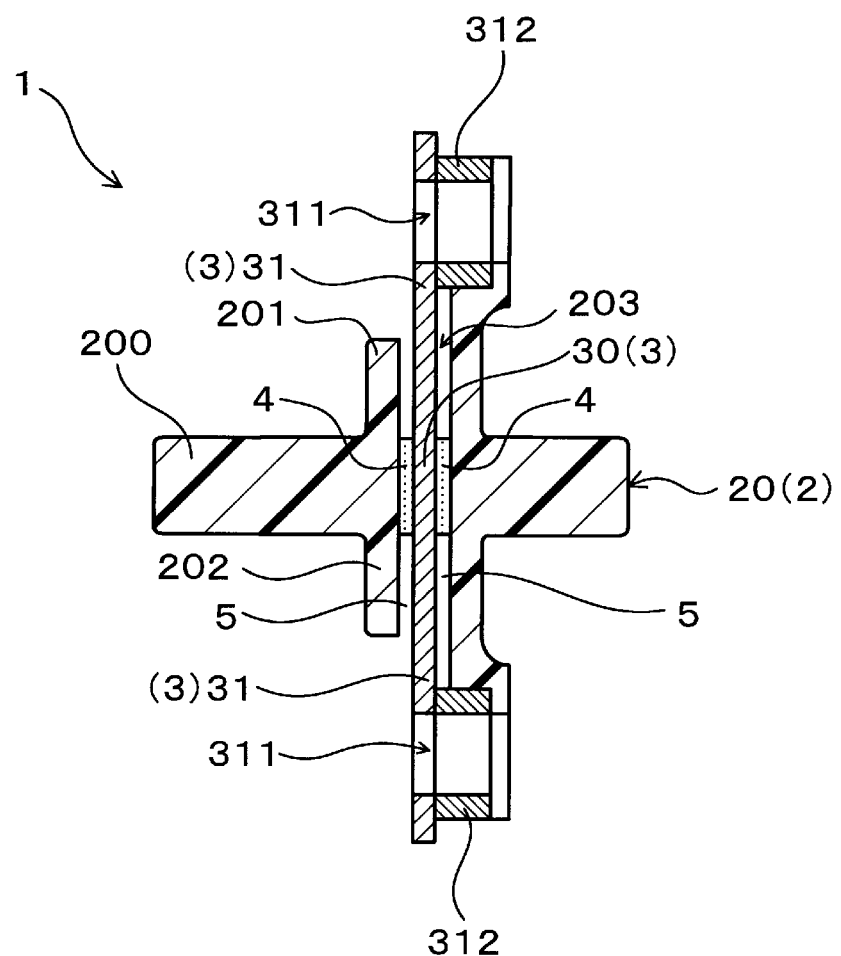
FIG. 3 is a cross-sectional view taken along III-III in FIG. 1.
Figure 4:
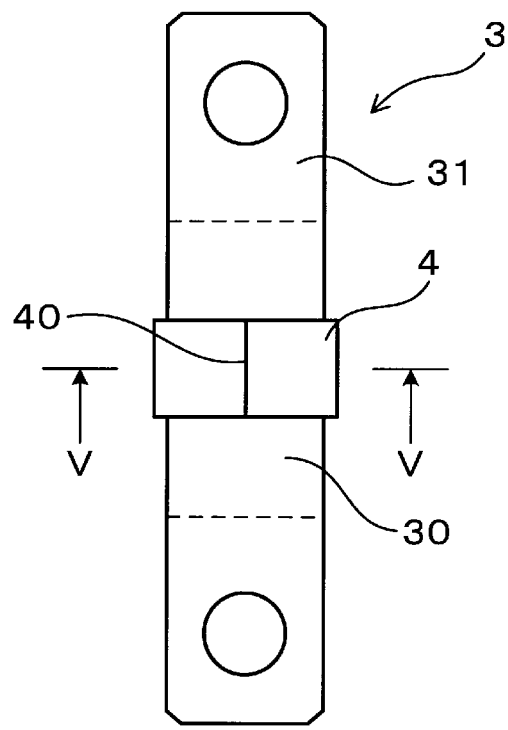
FIG. 4 is an illustrative view showing a bus bar and a sealing part that are included in the terminal block of Working Example 1.
Figure 5:
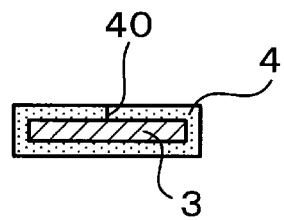
FIG. 5 is a cross-sectional view taken along V-V in FIG. 4.

A terminal block in Working Example 1 will be described using FIGS. 1 to 5. As shown in FIGS. 1 to 5, a terminal block 1 of this example includes a housing 2 having a resin part 20, bus bars 3, and sealing parts 4. The bus bars 3 each integrally include an embedded part 30 that is embedded in the resin part 20 and a connecting part 31 that projects outward from the resin part 20. The sealing part 4 seals a gap 5 existing between the embedded part 30 and the resin part 20. Hereinafter, this configuration will be described in details.

In this example, the resin part 20 is formed from a thermoplastic resin. The thermoplastic resin is a fiberglass-reinforced aromatic nylon resin. The resin part 20, specifically, includes a plate-like base portion 200, a plurality of first projecting parts 201 projecting outward from a surface of the base portion 200 on a first connection side, a plurality of second projecting parts 202 projecting outward from positions on a surface of the base portion 200 on a second connection side that correspond to the first projecting parts 201, and a plurality of bus bar holding holes 203 passing through the base portion 200, the first projecting parts 201 and the second projecting parts 202.

In this example, the bus bar 3 takes a plate-like shape. The bus bar 3 is, specifically, formed from a tin-plated copper plate. The bus bar 3 is fixed to the resin part 20 through insert molding. Specifically the bus bar 3 is fixed to the resin part 20 in a state of passing through the bus bar holding hole 203 in the resin part 20. The portion of the bus bar 3 that is arranged within the bus bar holding hole 203 is the embedded part 30. On the other hand, the portion of the bus bar 3 that is exposed externally from the bus bar holding hole 203 is the connecting part 31. Accordingly, in this example, the bus bar 3 has a connecting part 31 at either end of the embedded part 30. The connecting part 31 has a fastening hole 311 and a fastening nut 312 for fastening a wire harness or the like. Note that, in the drawings, an example is shown in which a plurality of bus bars 3 (specifically six) are arranged in a state of being separated from each other.

In this example, the sealing part 4 is, specifically, arranged in a portion of the gap 5 formed between the surface of the embedded part 30 and the inner wall surface of the bus bar holding hole 203 of the resin part 20. The sealing part 4 is, more specifically, arranged on a position of the embedded part 30 that corresponds to the base portion 200.

Here, the sealing part 4 is formed by an adhesive sheet. The adhesive sheet includes a thermosetting resin as an adhesive component. The thermosetting resin is, specifically, an epoxy resin. In this example, the sealing part 4 is, specifically formed, by one adhesive sheet wrapped around the outer periphery of the bus bar 3, in a portion of the embedded part 30 of the bus bar 3 in the longitudinal direction. Also, the adhesive sheet wrapped around the outer periphery of the bus bar 3 is in a state where one end face of the adhesive sheet is butted against the other end face. A join 40 caused by butting one end face of the adhesive sheet against the other side end face is linear. The width of the sealing part 4 is, specifically, 5.0 mm, and the thickness of the sealing part 4 is, specifically, 150 μm.

In the terminal block 1, the sealing part 4 is formed by an adhesive sheet. Thus, at the time of manufacturing the terminal block 1, the sealing part 4 can be formed, by attaching the adhesive sheet to a place on the bus bar 3 where the sealing part 4 is to be formed, and integrating the bus bar 3 to which the adhesive sheet is attached with the resin part 2 through insert molding. The adhesive sheet that is used for the sealing part 4 is readily formed to be uniform in width and thickness, compared with an adhesive coating material. Thus, with the terminal block 1, the sealing part 4 is readily formed to be uniform in width and thickness. Also, at the time of manufacturing the terminal block 1, drying time is unnecessary, unlike an adhesive coating material, and viscosity adjustment is also unnecessary. Accordingly, with the terminal block 1, manufacturing time can be shortened and manufacturing management is facilitated.

Working Example 2

A method for manufacturing a terminal, block in Working Example 2 will be described.

The method for manufacturing a terminal block in Working Example 2 is a method for manufacturing a terminal block 1 that has a housing 2 having a resin part 20, a bus bar 3 integrally including an embedded part 30 that is embedded in the resin part 20 and a connecting part 31 that projects outward from the resin part 20, and a sealing part 4 sealing a gap 5 existing between the embedded part 30 and the resin part 20. In this example, the terminal block 1 in Working Example 1 is, specifically, manufactured.

The method for manufacturing the terminal block has a step of attaching an adhesive sheet to a place on the bus bar 3 where the sealing part 4 is to be formed, and a step of integrating the bus bar 3 to which the adhesive sheet is attached with the resin part 20 through insert molding, and forming the sealing part 4 that is formed by the adhesive sheet.

In this example, the adhesive sheet includes a thermosetting resin consisting of an epoxy resin. At the time of attaching the adhesive sheet, the adhesive sheet is partially hardened with heat. The entire adhesive sheet is hardened by the heat produced at the time of insert molding, and forms the sealing part 4.

The method for manufacturing the terminal block, has the above steps. Thus, the terminal block 1 with respect to which the sealing part 4 is readily formed to be uniform in width and thickness, manufacturing time can be shortened and manufacturing management is facilitated can be manufactured.

Although working examples of the present disclosure have been described in detail above, the present disclosure is not limited to the foregoing working examples, and various modifications can be made without departing from the spirit of the disclosure.

The invention claimed is:

1. A terminal block comprising:
   a housing having a resin part;
   a bus bar that integrally includes an embedded part embedded in the resin part through insert molding and a connecting part projecting outward from the resin part; and
   a seal sealing a gap existing between the embedded part and the resin part,
   wherein the seal is formed by an adhesive sheet that includes an epoxy resin that has been partially hardened with heat, wherein the entire adhesive sheet has been hardened by heat produced by the insert molding.

2. The terminal block according to claim 1,
   wherein the seal is formed by the adhesive sheet wrapped around an outer periphery of the bus bar, in a portion of the embedded part of the bus bar, and
   the adhesive sheet is in a state where one end face of the adhesive sheet is butted against another end face of the adhesive sheet.

3. The terminal block according to claim 1,
   wherein the terminal block is configured to connect an automotive wire harness.

4. A manufacturing method for a terminal block that has a housing having a resin part, a bus bar that integrally includes an embedded part embedded in the resin part and a connecting part projecting outward from the resin part, and a seal sealing a gap existing between the embedded part and the resin part, the method comprising:

attaching an adhesive sheet that includes an epoxy resin to a place on the bus bar where the seal is to be formed, and partially hardening the adhesive sheet with heat at the time of attaching the adhesive sheet; and integrating the bus bar to which the adhesive sheet is attached with the resin part through insert molding, and forming the seal that is formed by the adhesive sheet wherein the entire adhesive sheet is hardened by heat produced by the insert molding.

\* \* \* \* \*